3,456,049
GRADUAL-RELEASE TABLET
Edward Alexander Hotko, Scotch Plains, and Leon Lachman, Millburn, N.J., assignors to Ciba Corporation, New York, N.Y., a corporation of Delaware
No Drawing. Continuation-in-part of application Ser. No. 458,763, May 25, 1965. This application Feb. 7, 1966, Ser. No. 525,327
Int. Cl. A61k 27/12
U.S. Cl. 424—22    12 Claims

ABSTRACT OF THE DISCLOSURE

A solid pharmaceutical excipient comprising: (a) a fatty substance, (b) alginic acid, and (c) a granulating liquid, is suitable for pharmaceutical compositions containing at least one readily soluble component, e.g. a potassium salt, and one slightly soluble component, e.g. a diuretic benzothiadiazine.

---

This is a continuation-in-part of application Ser. No. 458,763, filed May 25, 1965, now abandoned.

The present invention concerns and has for its object the provision of a solid pharmaceutical preparation of the gradual-release type, containing as the pharmacological active ingredient a readily soluble as well as a slightly soluble component.

The majority of the gradual-release tablet, dragee or capsule dosage forms known in the art depend on a readily soluble substance only, which diffuses from a waxy or plastic matrix in which it is imbedded. When a slightly soluble substance is used in these matrices, its release is less predictable, resulting in inconsistent therapeutic effects. In certain instances said matrix retains coherent shape during its travel through the gastro-intestinal tract, resulting in the elimination of part of the entrapped slightly soluble, active component with the feces. In other instances, where the release of the slightly soluble component sufficiently takes place, the readily soluble component diffuses too rapidly, causing lesions in particular locations of the gastro-intestinal tract due to high concentration levels.

We have now found a pharmaceutical excipient which gradually and almost equally releases into the intestines a readily soluble as well as a slightly soluble substance, both of which are uniformly embedded therein. Said excipient comprises:

(a) a fatty substance
(b) alginic acid, and
(c) a granulating liquid

Accordingly, the present invention concerns: (1) a solid pharmaceutical excipient containing the components mentioned under (a) to (c) and, moreover, (2) a solid pharmaceutical composition containing in admixture with the excipient mentioned under (a) to (c) at least the following readily and slightly soluble components: (d) a therapeutically acceptable potassium salt and (e) an orally active diuretic compound causing hypokalemia.

The fatty substances used in the preparations of the present invention are, for example, fats, preferably vegetable fats, such as cottonseed, soybean, peanut, coconut, babassu, palm, olive, castor and rape oil, preferably their partly or entire hydrogenated forms; fatty acids, such as lauric, myristic, palmitic, margaric, stearic, arachidic, behenic, lignoceric and cerotic acid as well as their alkaline earth and earth metal salts, such as magnesium, calcium and aluminum salts; natural and synthetic waxes, such as bees, chinese insect, shellac, sugarcane, montan, japan, esparto and candelilla wax, spermaceti, waxes derived from petroleum and synthetic products, e.g. polyethyleneglycols; fatty alcohols, such as cetyl, stearyl, cocceryl and oleyl alcohol as well as their esters; fatty acid amides, such as acra waxes; mixtures of these substances as well as resin-wax mixtures, such as gum-damar, polyethylene and cellulose ether-wax mixtures. Said fatty substances preferably should melt in the range between about 40 and 100° C.

The alginic acid used is a colloidal substance, obtained from seaweeds and containing as the main constituents mannuronic and galuronic acid. It may be used in its various marketed forms. A 1% aqueous solution of its sodium salt normally shows a viscosity at 20° and a pH between 6 and 8 of about 10 to 1500 centipoises (measured with a Brookfield viscometer, spindle 3). A preferred alginic acid is that of which the 1% sodium salt solution has a viscosity of about 100 to 1000 centipoises.

The granulating liquid advantageously is such that forms a film insoluble in an acidic medium but soluble in an alkaline medium, such as an acidic cellulose ester, preferably a cellulose acetate phthalate or a salt or ester thereof, such as an alkali or alkaline earth metal or an ammonium salt thereof, e.g. the sodium, potassium, magnesium, calcium, ammonium or a tri-lower alkyl- or tri-(hydroxy lower alkyl)-amine salt, e.g. the trimethylamine, triethylamine or triethanolamine salt, or a lower alkyl, e.g. methyl, ethyl, propyl or butyl ester thereof. Said cellulose esters are usually dissolved in an alcohol, and/or ketone, preferably ethanol and acetone; they are described for example, in U.S. Patent No. 2,196,768. Other granulating liquids used are for example, aqueous solutions of a salt of carboxymethyl cellulose or of alginic acid, such as those mentiioned above for the cellulose acetate phthalate. The granulating liquid, however, may also be a solvent of the above solids only, which latter may be mixed together with the fatty substance and the alginic acid.

A therapeutically acceptable potassium salt is, for example, an inorganic salt, such as a halide, e.g. the chloride or bromide, a sulfate or phosphate, the nitrate or perchlorate. It may also be a salt of organic acids, for example, that of carboxylic acids, such as alkanoic acids, e.g. formic, acetic, propionic, butyric, pivalic or phytic acid, of lower alkenoic acids, e.g. methacrylic or 3-butenecarboxylic acid, of hydroxy-lower alkanoic acids, e.g. glycolic, lactic, glyceric or gluconic acid, of lower alkoxy-lower alkanoic acids, e.g. methoxy-acetic or ethoxy-acetic acid, of lower alkanoyl-lower alkanoic acids, e.g. pyruvic acid, of lower aliphatic dicarboxylic acids, for example, lower alkane dicarboxylic acids, e.g. oxalic, malonic, succinic, methylsuccinic, dimethylsuccinic, glutaric, α-methylglutaric, α,α-dimethylglutaric, β-methylglutaric or adipic acid, of lower alkane dicarboxylic acid halfesters with lower alkanols, e.g. succinic acid monomethyl ester or glutaric acid monoethyl ester, of lower alkene dicarboxylic acids, e.g. itaconic, homoitaconic, citraconic, homocitraconic, pyrocinchonic, xeronic or fumaric acid, of lower alkene dicarboxylic acid halfesters with lower alkanols, e.g. fumaric acid monoethyl ester, of hydroxy-lower alkane dicarboxylic acids, e.g. tartronic, malic or tartaric acid, of lower alkoxy-lower alkane dicarboxylic acids, e.g. α,β-dimethoxysuccinic acid, of lower alkoxy-lower alkene dicarboxylic acids, e.g. ethoxy-maleic acid, of lower aliphatic tricarboxylic acids, for example, lower alkane tricarboxylic acids, e.g. tricarballylic acid, of lower alkene tricarboxylic acids, e.g. aconitic acid, of hydroxy-lower alkane tricarboxylic acids, e.g. citric acid, of cycloaliphatic monocarboxylic acids, such as cycloalkane monocarboxylic acids, e.g. hexahydro-benzoic acid, of cycloaliphatic dicarboxylic acids, such as cycloalkane dicarboxylic acids, e.g. hexahydrophthalic acid, of cycloaliphatic-lower aliphatic monocarboxylic acids, such as cycloalkyl-lower alkanoic acids, e.g. cyclopentyl-propionic acid, of monocyclic or bicyclic carbocyclic aryl carboxylic or carbocyclic aryl-lower aliphatic carboxylic acids, e.g. benzoic, 4-amino-benzoic, dihydrocinnamic, cinnamic, mandelic, salicylic, 4-aminosalicylic, 2-phenoxybenzoic or 2-acetoxybenzoic acid, of monocyclic or bicyclic carbocyclic aryl-dicarboxylic acids, e.g. phthalic acid, of monocyclic or bicyclic heterocyclic aryl carboxylic acids, e.g. nicotinic, isonicotinic, 6-quinoline carboxylic, thienoic or furoic acid, of amino acids, e.g. aspartic, glutamic, hydroxy-glutamic acid, glycine, alanine, methionine, serine, threonine tryptophane, lysine or arginine, of organic sulfonic acids, such as lower alkane sulfonic acids, e.g. methane or ethane sulfonic acid, of lower-hydroxy-alkane sulfonic acids, e.g. 2-hydroxyethane sulfonic acid or of monocyclic or bicyclic carbocyclic aryl sulfonic acids, e.g. p-toluene sulfonic acid.

The potassium salt used in the invention may be an acidic, neutral or basic salt, depending on the anionic part thereof.

Preferred potassium salts used in the present invention are those described in co-pending application Ser. No. 522,345, filed Jan. 24, 1966 and now abandoned, i.e. those derived from carboxylic acids having a dissociation constant (for the first hydrogen) within the range of $1 \times 10^{-2}$ to $1 \times 10^{-10}$ at 25° C., especially those of tartaric and citric acid.

An orally active diuretic compound is, for example, such already used in combination with potassium salts, especially with potassium chloride. Preferred diuretic compounds used in the compositions of the invention are those of the 1,2,4-benzothiadiazine type, saturated or unsaturated in the 3,4-position, such as those described in U.S. Patents Nos. 2,809,194, 3,163,643, 3,163,644, 3,163,645, 3,177,212 and 3,178,424.

Compositions of the present invention that are outstandingly useful are those that contain as the ingredient mentioned under item (e) one of the following single compounds:

6-chloro- or 6-trifluoromethyl-7-sulfamyl-2H-3,4-dihydro-1,2,4-benzothiadiazine-1,1-dioxide and their 3-n-butyl, 3-isobutyl, 3-(2-methyl-propyl), 3-(2-ethylmercaptoethyl), 3-(benzylmercaptomethyl), 3-dichloromethyl, 3-benzyl, 3-(α-methylbenzyl), 3-(2-phenyl-ethyl), 3-cyclopentyl, 3-cyclohexyl, 3-(3-cyclohexenyl), 3-cyclopropylmethyl, 3-cyclobutyl-methyl, 3-cyclopentylmethyl, 3-(2-cyclopentyl-ethyl), 3-(1-cyclopentyl-ethyl), 3-(5-norbornylenyl), 3-(9-fluorenyl), and 3-thenyl derivatives as well as their 2-ethyl, 2-allyl, 2-n-propyl, 2-benzyl and 2-(2-pyranyl) derivatives and their 2-methyl-3-chloromethyl, 2-methyl-3-(2,2,2-trifluoroethylmercaptomethyl), 2-ethyl-3-dichloromethyl, 2-benzyl-3-chloromethyl and 2,7-bis-n-butylcarbamyl-3-chloromethyl derivatives.

The pharmaceutical compositions of the present invention eliminate the short comings mentioned in the beginning. Moreover, by varying the ratio of the ingredients mentioned under (a) to (c), the release characteristics of the composition in the stomach and the intestines can be regulated. Having this flexibility now available, it is possible to tailor each gradual-release composition, such as tablet, dragee or capsule, the latter containing, for example, coated particles, to give optimal effectiveness for the readily and slightly soluble component, making them completely available for the therapeutic action. In addition, the compositions of the invention are prepared with the use of normal processing equipment as employed for the usual solid dosage forms. The pharmaceutical compositions of the invention are useful diuretic drugs which neither cause hypokalemia nor irritation of the gastrointestinal tract. Small bowel ulcerations have been reported to be associated with the prolonged treatment of edema, using several of the marketed enteric-coated tablets containing potassium chloride and a 1,2,4-benzothiadiazine. These ulceratioins are, according to tests with monkeys, due to locally high potassium chloride concentrations in the small bowel.

In the compositions of this invention the fatty substance is employed in a concentration range of about 3 to 70%, preferably of about 5 to 50%, but especially of about 5 to 15% of the potassium salt. The alginic acid is employed in a concentration range of about 0.25 to 30%, preferably of about 1 to 20% and especially of about 3 to 15% of the potassium salt. The granulating liquid may be used in the range of 1 to 50%, preferably of about 2 to 25%, but especially of about 5 to 10% of the potassium salt. A single dosage unit of the present compositions, such as one tablet or dragee, contains the potassium salt in an amount equivalent to about 100 to 1500 mg., preferably to about 250 to 1250 mg., but especially to about 500 to 1000 mg. of potassium chloride. The diuretic compound therein is employed in the usual amount, depending on the activity. A single dosage unit preferably contains from about 0.1 to 100 mg., especially from about 0.1 to 50 mg. of the diuretic compound.

If desired, the compositions of the invention may contain other galenically and/or therapeutically valuable substances, for example, preserving, stabilizing or wetting agents, colors as means of identification, as well as hypotensive agents, such as Rauwolfia and related alkaloids, e.g. reserpine, deserpidine, rescinnamine or the carbethoxy-syringate of methyl reserpate (syrosingopine), hydrazino-phthalazines, e.g. 1-hydrazino-phthalazine or 1,4-dihydrozino-phthalazine, guanethidines, e.g. 2-heptamethyleneimino-ethyl-guanidine, spironolactones, e.g. 3-(3-oxo-7α-acetylthio-17β-hydroxy-4-androsten-17a-yl)-propionic acid-γ-lactone, barbiturates, e.g. sodium 5-sec.-butyl-5-ethyl-barbiturate or sodium 5-ethyl-5-phenyl-barbiturate, protoveratrines, e.g. protoveratrine A, or purines, e.g. theobromine or the theophylline choline salt.

One may use a single additional therapeutic, e.g. hypotensive, agent in the compositions of the invention or combinations of them. For example, if desired, one may utilize the 3,4-dihydro-1,2,4-benzothiadiazine-1,1-dioxide and the therapeutically acceptable potassium salt together with a combination of a hydrazino-phthalazine and a Rauwolfia alkaloid, preferably reserpine.

Especially valuable are compositions that contain per unit doses the therapeutically acceptable potassium salt, preferably di-potassium tartrate or tri-potassium citrate, equivalent to about 500 to 1000 mg. of potassium chloride, together with about:

(a) 10 to 50 mg. of 6-chloro-7-sulfamyl-2H-3,4-dihydro-1,2,4-benzothiadiazine-1,1-dioxide,
(b) 10 to 50 mg. of 6-trifluoromethyl-7-sulfamyl-2H-3,4-dihydro-1,2,4-benzothiadiazine-1,1-dioxide,
(c) 0.1 to 0.5 mg. of 3-cyclopentylmethyl-6-chloro-7-sulfamyl-2H-3,4-dihydro-1,2,4-benzothiadiazine-1,1-dioxide,
(d) 1.0 to 5.0 mg. of 3-(5-norbornenyl-2-)-6-chloro-7-sulfamyl-2H-3,4-dihydro-1,2,4-benzothiadiazine-1,1-dioxide,
(e) 1.0 to 5.0 mg. of 2-methyl-3-chloromethyl-6-chloro-7-sulfamyl-2H-3,4-dihydro-1,2,4-benzothiadiazine, 1,1-dioxide,
(f) 1.0 to 5.0 mg. of 3-dichloromethyl-6-chloro-7-sulfamyl-2H-3,4-dihydro-1,2,4-benzothiadiazine-1,1-dioxide,
(g) 1.0 to 5.0 mg. of 3-benzyl-6-trifluoromethyl-7-sulfamyl-2H-3,4-dihydro-1,2,4-benzothiadiazine-1,1-dioxide,
(h) 1.0 to 5.0 mg. of 2-methyl-3-(2,2,2-trifluoroethylmercaptomethyl)-6-chloro-7-sulfamyl-2H-3,4-dihydro-1,2,4-benzothiadiazine-1,1-dioxide, both active components of which are embedded in a mixture comprising relative to the potassium salt 5–15% of the fatty substance, 3–15% of alginic acid and 5–10% of cellulose acetate phthalate or one of the above shown derivatives thereof.

These compositions may contain the following additional ingredients:

(a) together with about 10 to 50 mg. of 1-hydrazino-phthalazine hydrochloride,
(a) together with about 0.3 to 1.5 mg. of syrosingopine,
(a) together with about 10 to 50 mg. of 3-(3-oxo-7α-acetylthio-17β-hydroxy-4 - androsten-17α-yl)-propionic acid-γ-lactone,
(a) together with about 100 to 500 mg. of 2-methyl-2-propyl-1,3-propanediol dicarbamate,
(a) together with about 0.1 to 0.5 mg. of reserpine or deserpidine,
(a) together with about 0.1 to 0.5 mg. of reserpine and 5.0 to 25 mg. of 1,4-dihydrazino-phthalazine,
(a) together with about 0.1 to 0.5 mg. of reserpine and 10 to 50 mg. of 1-hydrazino-phthalazine,
(a) together with about 0.1 to 0.5 mg. of reserpine and about 10 to 50 mg. of sodium 5-sec.-butyl-5-ethyl-barbiturate,
(b) together with about 0.1 to 0.5 mg. of reserpine and about 0.1 to 0.5 mg. of protoveratrine A,
(c) together with about 5 to 25 mg. of 2-heptamethylene-iminoethylguanidine sulfate,
(d) together with about 0.1 to 0.5 mg. of reserpine,
(e) together with about 0.1 to 0.5 mg. of deserpidine,
(e) together with about 0.1 to 0.5 mg. of reserpine and 1.0 to 5.0 mg. of veratrum viride tannate,
(f) together with about 0.1 to 0.5 mg. of reserpine,
(h) together with about 0.1 to 0.5 mg. of reserpine.

Following are working examples, illustrative of, but in no way intended to limit the present invention. Unless otherwise indicated, all parts, wherever given in the specification, are parts by weight. All sieve sizes are U.S. Standard sieve sizes.

EXAMPLE 1

Material for 8000 tablets: Grams
Mixture of hydrogenated vegetable oil melting at about 60° C., particle size 325–400 mesh. (Sterotex of the Capital City Products Co.) _____ 580.0
Alginic acid (purified grade having less than 3% ignition residue) 50–100 mesh _____ 174.0
Cellulose acetate phthalate _____ 500.0
Tri-potassium citrate monohydrate, 60–200 mesh _____ 5800.0
6 - chloro - 7 - sulfamyl - 2H - 3,4, - dihydro-1,2,4-benzothiadiazine - 1,1 - dioxide, 60–100 mesh _____ 200.0
Anhydrous ethanol _____ 750.0
Anhydrous acetone _____ 750.0

Procedure.—The powders, except the cellulose acetate phthalate, are screened through a 20 mesh screen and mixed in a mixer for 30 minutes. A 25% solution of the cellulose acetate phthalate in a 1:1 mixture of anhydrous ethanol and acetone is added to the powder mixture to form a granulate. After a period of mixing the wet mass is screened through a 10 mesh screen and dried in a circulating hot air oven. The dry granulate is screened again through a 10 mesh screen and compressed on a suitable tablet press into tablets each weighing 906 mg.

The substances used in the following examples have the analogous particle size and quality respectively.

EXAMPLE 2

Material for 6000 tablets: Grams
Sterotex _____ 238.5
Alginic acid _____ 143.0
Cellulose acetate phthalate _____ 500.0
Di-potassium tartrate hemihydrate _____ 4770.0
6 - chloro - 7 - sulfamyl-2H-3,4-dihydro-1,2,4-benzothiadiazine-1,1,-dioxide _____ 150.0
Anhydrous ethanol, q.s.
Anhydrous acetone, q.s.

Procedure.—As described in Example 1.

EXAMPLE 3

Material for 3000 tablets: Grams
Sterotex _____ 59.6
Alginic acid _____ 35.7
Cellulose acetate phthalate _____ 124.3
Di-potassium tartrate hemihydrate _____ 1192.5
6 - chloro - 7 - sulfamyl-2H-3,4,-dihydro-1,2,4-benzothiadiazine-1,1-dioxide _____ 75.0
Anhydrous ethanol, q.s.
Anhydrous acetone, q.s.

Procedure.—As described in Example 1.

EXAMPLE 4

Material for 1500 tablets: Grams
Modified glycero stearate melting at about 60° C. _____ 125.0
Alginic acid _____ 125.0
Cellulose acetate phthalate _____ 92.0
Potassium chloride _____ 2500.0
6 - chloro - 7 - sulfamyl-2H-3,4-dihydro-1,2,4-benzothiadiazine-1,1-dioxide _____ 50.0
Anhydrous ethanol, q.s.
Anhydrous acetone, q.s.

Procedure.—As described in Example 1.

EXAMPLE 5

Material for 5000 tablets: Grams
Modified glycero stearate _____ 250.0
Alginic acid _____ 125.0
Cellulose acetate phthalate _____ 125.0
Potassium chloride _____ 2500.0
6 - chloro - 7 - sulfamyl-2H-3,4-dihydro-1,2,4-benzothiadiazine-1,1-dioxide _____ 125.0
Anhydrous ethanol, q.s.
Anhydrous acetone, q.s.

Procedure.—As described in Example 1.

EXAMPLE 6

Material for 2000 tablets: Grams
Sterotex _____ 145.0
Alginic acid _____ 49.7
Cellulose acetate phthalate particle size 5–10 microns _____ 149.3
Tri-potassium citrate monohydrate _____ 1450.0
6 - chloro - 7 - sulfamyl-2H-3,4-dihydro-1,2,4-benzothiadiazine-1,1-dioxide _____ 50.0
Anhydrous acetone, q.s.

Procedure.—Sift all the powders through a 20 mesh screen and mix for 30 minutes. Granulate the powder mixture with anhydrous acetone and pass the wet material through a 10 mesh screen. Dry at 40° C. and pass the dried granulate through a 10 mesh screen. Compress into tablets weighing 897 mg. using 14/32″ dies, modified ball punches.

EXAMPLE 7

Material for 2000 tablets:
Sterotex _____ grams__ 159.0
Alginic acid _____ do____ 47.7
Cellulose acetate phthalate _____ do____ 165.7
Di-potassium tartrate hemihydrate ____ do____ 1590.0
6 - chloro - 7 - sulfamyl-3,4-dihydro-2H-1,2,4-benzothiadiazine-1,1-dioxide ___do____ 100.0
Anhydrous ethanol _____ ml__ 331.4
Anhydrous acetone _____ ml__ 331.4

Procedure.—Pass the hydrochlorothiazide, potassium tartrate, sterotex and alginic acid through a 20 mesh screen and mix for 30 minutes. Dissolve the cellulose acetate phthalate in the alcohol-acetone mixture 1/1, wet with it the powders and mix thoroughly. Dry with warm air and pass the dried material through a 16 mesh screen. Compress into tablets using 14/32″ diameter dies, modified ball punches.

EXAMPLE 8

Material for 700 tablets:

| | | |
|---|---|---|
| Sterotex | grams | 81.7 |
| Alginic acid | do | 42.0 |
| Cellulose acetate phthalate | do | 300.0 |
| Potassium phosphate dibasic | do | 816.9 |
| 6 - chloro - 7 - sulfamyl-3,4-dihydro-2H-1,2,4-benzothiadiazine-1,1-dioxide | do | 35.0 |
| Anhydrous ethanol | ml | 331.4 |
| Anhydrous acetone | ml | 331.4 |

Procedure.—As described in Example 7 but using 13/32" diameter punches and dies.

This invention may be variously otherwise embodied within the scope of the appended claims. Thus, one may substitute an equivalent amount of another diuretic benzothiadiazine disclosed herein, such as those mentioned under items (b) to (h) hereinbefore, for that shown in any of the working examples to obtain analogous compositions.

EXAMPLE 9

Material:

| | | |
|---|---|---|
| Sterotex (atomized) | grams | 20,300 |
| Alginic acid | do | 6,090 |
| Cellulose acetate phthalate | do | 17,500 |
| Tri-potassium citrate monohydrate | do | 203,000 |
| 6 - chloro - 7 - sulfamyl-3,4-dihydro-2H-1,2,4-benzothiadiazine-1,1-dioxide | do | 7,000 |
| Anhydrous acetone | ml | 38,000 |

Procedure.—The benzothiadiazine and potassium citrate are ground on the Fitzpatrick mill running at high speed and sieved through a 30 mesh screen. The cellulose acetate phthalate is ground in the same way but sieved through a Type A, No. 1 screen. All the powders are then mixed for 30 minutes in a suitable mixer and granulated by addition of the acetone. The wet granulation is dried in a circulating hot air oven at 38° C., broken on the Fitzpatrick mill running at medium speed and sieved through a 10 mesh screen. The granules are compressed to tablets, each weighing 0.906 gram using 14/36" modified ball punches.

What is claimed is:

1. A solid gradual-release, embedding matrix-type dosage unit comprising: (a) an amount of a readily soluble potassium salt effective to counteract benzothiadiazine-diuretic-caused hypokalemia, (b) an amount of a slightly soluble benzothiadiazine diuretic capable of causing hydrokalemia, and (c) a pharmaceutical excipient comprising relative to the potassium salt, 5–15% of a fatty substance, 3–15% of alginic acid and 5–10% of cellulose acetate phthalate in a granulating liquid.

2. A dosage unit, as claimed in claim 1, wherein the fatty substance melts within the range of about 40 and 100° C. and is selected from the group consisting of vegetable fats, hydrogenated vegetable fats, fatty acids, their alkaline earth and earth metal salts, natural waxes, synthetic waxes, fatty alcohols and their esters, fatty acid amides, mixtures of these substances and resin-wax mixtures.

3. A dosage unit, as claimed in claim 1, wherein the alginic acid is that of which the 1% aqueous solution of its sodium salt shows a viscosity at 20° and a pH between 6 and 8 of about 10 to 1500 centiposes.

4. A dosage unit, as claimed in claim 1, comprising relative to the potassium salt 5–15% of a hydrogenated vegetable fat melting in the range between about 40 and 100° C., 3–15% of alginic acid of which the 1% aqueous solution of its sodium salt shows a viscosity at 20° and a pH between 6 and 8 of about 100 to 1000 centipoises, and 5–10% of cellulose acetate phthalate in a granulating liquid.

5. A dosage unit, as claimed in claim 1, comprising a fatty substance, alginic acid and the cellulose acetate phthalate in the proportion of about 3:0.6:1 to 7:3:5 by weight.

6. A dosage unit, as claimed in claim 5, wherein the ingredients art in the proportion of about 5:1:2 to 10:4:5.

7. A dosage unit, as claimed in claim 5, wherein the ingredients are in the proportion of about 5:3:5 to 3:3:2.

8. A dosage unit, as claimed in claim 1, wherein the potassium salt is derived from acids having a dissociation constant within the range of $1 \times 10^{-2}$ to $1 \times 10^{-10}$ at 25°.

9. A dosage unit, as claimed in claim 1, wherein the potassium salt is di-potassium tartrate or tri-potassium citrate.

10. A dosage unit as claimed in claim 1, wherein the diuretic is a member selected from the group consisting of 6-chloro-7-sulfamyl-2H-3,4-dihydro-1,2,4-benzothiadiazine-1,1-dioxide, 6-trifluoromethyl-7-sulfamyl-2H-3,4-dihydro - 1,2,4-benzothiadiazine-1,1-dioxide, 3-cyclopentylmethyl-6-chloro-7-sulfamyl-2H-3,4 - dihydro-1,2,4-benzothiadiazine-1,1-dioxide, 3-(5 - norbornenyl-2-)-6-chloro-7-sulfamyl-2H-3,4-dihydro-2,4-benzothiadiazine - 1,1-dioxide, 2-methyl-3-chloromethyl-6-chloro-7-sulfamyl-2H-3,4-dihydro-1,2,4-benzothiadiazine - 1,1-dioxide, 3 - dichloromethyl - 6 - chloro-7-sulfamyl-2H-3,4-dihydro-1,2,4-benzothiadiazine-1,1-dioxide, 3 - benzyl-6-trifluoromethyl-7-sulfamyl-2H-3,4-dihydro-1,2,4-benzothiadiazine - 1,1 - dioxide, and 2-methyl-3-(2,2,2-trifluoroethylmercaptomethyl)-6-chloro - 7 - sulfamyl-2H-3,4-dihydro-1,2,4-benzothiadiazine-1,1-dioxide.

11. A dosage unit as claimed in claim 1, wherein a single dosage unit contains the potassium salt in an amount equivalent to about 500 to 1000 mg. of potassium chloride.

12. A dosage unit as claimed in claim 1, wherein a single dosage unit contains the diuretic in an amount of about 0.1 to 50 mg.

References Cited

UNITED STATES PATENTS

| | | | |
|---|---|---|---|
| 2,793,979 | 5/1957 | Svedres | 167—82 |
| 2,805,977 | 9/1957 | Robinson et al. | 167—82 |
| 2,991,226 | 7/1961 | Millar et al. | 167—82 |
| 3,062,720 | 11/1962 | Costello | 167—82 |
| 3,065,143 | 11/1962 | Christenson et al. | 167—82 |
| 3,079,303 | 2/1963 | Raff et al. | 167—82 |

OTHER REFERENCES

21 Code Federal Regulations 3.15; 3.512 (Jan. 1, 1967).

LEWIS GOTTS, Primary Examiner

S. K. ROSE, Assistant Examiner

U.S. Cl. X.R.

424—246

CASE SU-436/1+2

PO-1050
(5/69)

UNITED STATES PATENT OFFICE
CERTIFICATE OF CORRECTION

Patent No. 3,456,049      Dated July 15, 1969

Inventor(s) Edward Alexander Hotko et al

It is certified that error appears in the above-identified patent and that said Letters Patent are hereby corrected as shown below:

Column 7, line 48, "hydrokalemia" should be -- hypokalemia --.

Column 8, line 14, "art" should be -- are --; line 30, "2,4-benzothiadiazine" should be -- 1,2,4-benzothiadiazine --.

SIGNED AND SEALED
DEC 22 1970

(SEAL)
Attest:

Edward M. Fletcher, Jr.
Attesting Officer

WILLIAM E. SCHUYLER, JR.
Commissioner of Patents